W. EHRLICH.
FOCUSING ATTACHMENT FOR CAMERAS.
APPLICATION FILED JULY 21, 1916.

1,217,728.

Patented Feb. 27, 1917.
2 SHEETS—SHEET 1.

WITNESSES
Frederick Diehl.
C. Bradway.

INVENTOR
W. Ehrlich
BY Munn Co
ATTORNEYS

W. EHRLICH.
FOCUSING ATTACHMENT FOR CAMERAS.
APPLICATION FILED JULY 21, 1916.

1,217,728.

Patented Feb. 27, 1917.
2 SHEETS—SHEET 2.

WITNESSES
Frederick Wiehl.
O. Bradway

INVENTOR
W. Ehrlich
BY
Wm Leo
ATTORNEYS

UNITED STATES PATENT OFFICE.

WILLIAM EHRLICH, OF NEW YORK, N. Y.

FOCUSING ATTACHMENT FOR CAMERAS.

1,217,728.   Specification of Letters Patent.   Patented Feb. 27, 1917.

Application filed July 21, 1916. Serial No. 110,472.

*To all whom it may concern:*

Be it known that I, WILLIAM EHRLICH, a citizen of the United States, and a resident of the city of New York, borough of the Bronx, in the county of the Bronx and State of New York, have invented a new and Improved Focusing Attachment for Cameras, of which the following is a full, clear, and exact description.

This invention relates to cameras, and more particularly to an attachment used in connection with the ground glass for facilitating focusing and doing away with the usual focusing cloth.

The general objects of the invention are to improve and simplify the construction and operation of devices of the character referred to so as to be reliable and efficient in use, comparatively simple and inexpensive to manufacture, and so designed as to be readily adjusted for operation.

A more specific object of the invention is the provision of a device which is so designed as to be capable of being fastened to a camera back by means of screws so as to do away with the focusing cloth, the device being in the form of a leather pocket having a reflecting mirror therein and a view opening at the top so that the focused image can be seen on the mirror with the image upright but reversed as to right and left.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a perspective view of the focusing attachment in open position;

Figure 1:
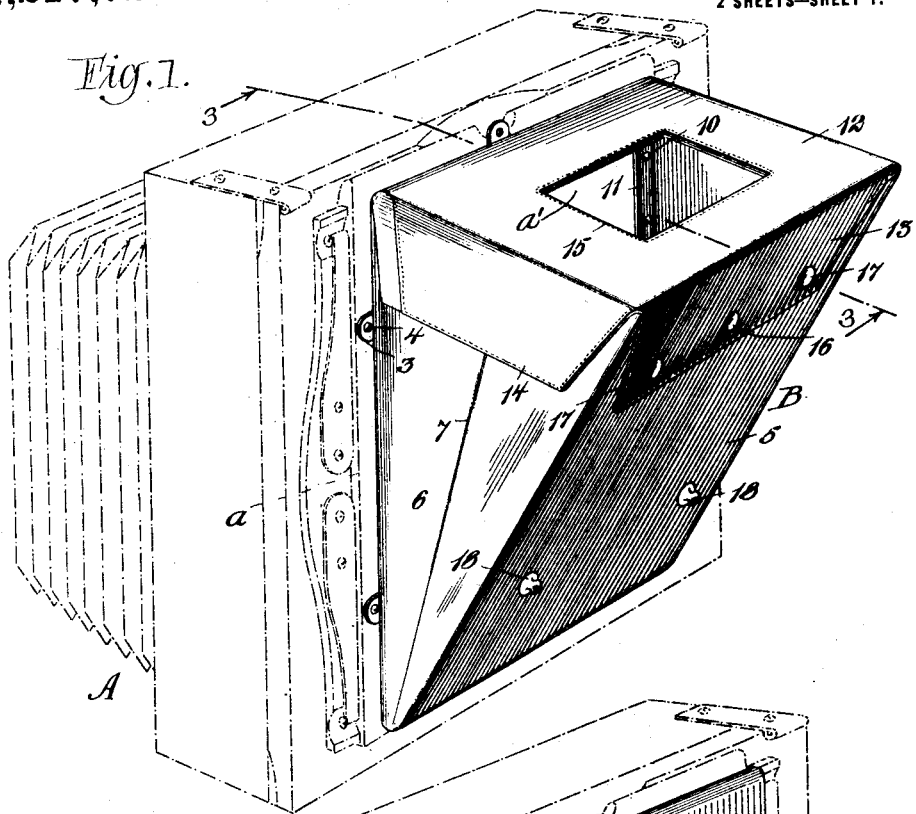
Figure 2:
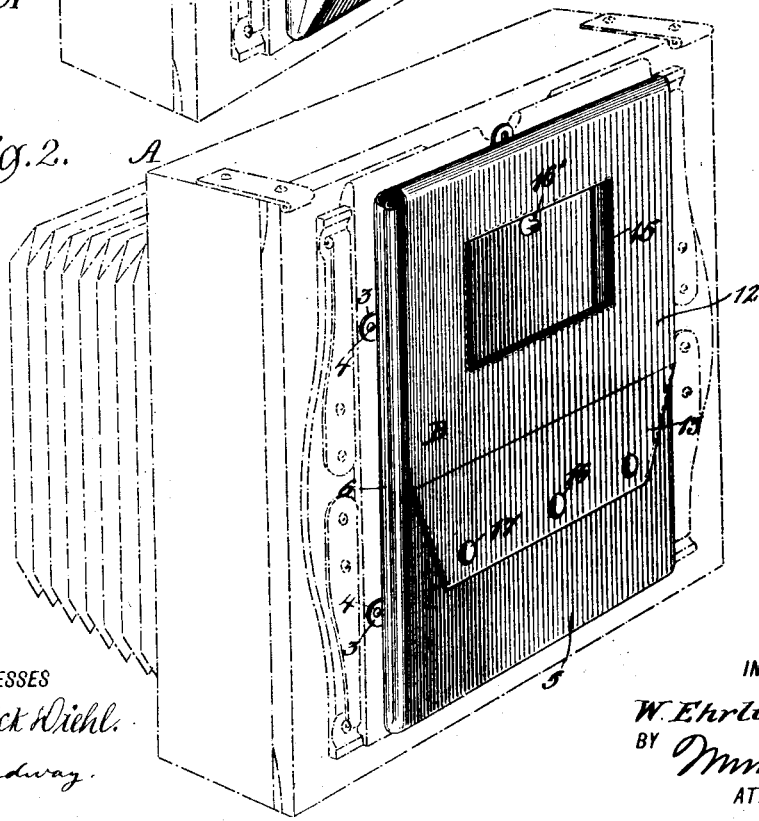
Fig. 2 is a similar view showing the attachment folded, as when not in use.
Figure 3:
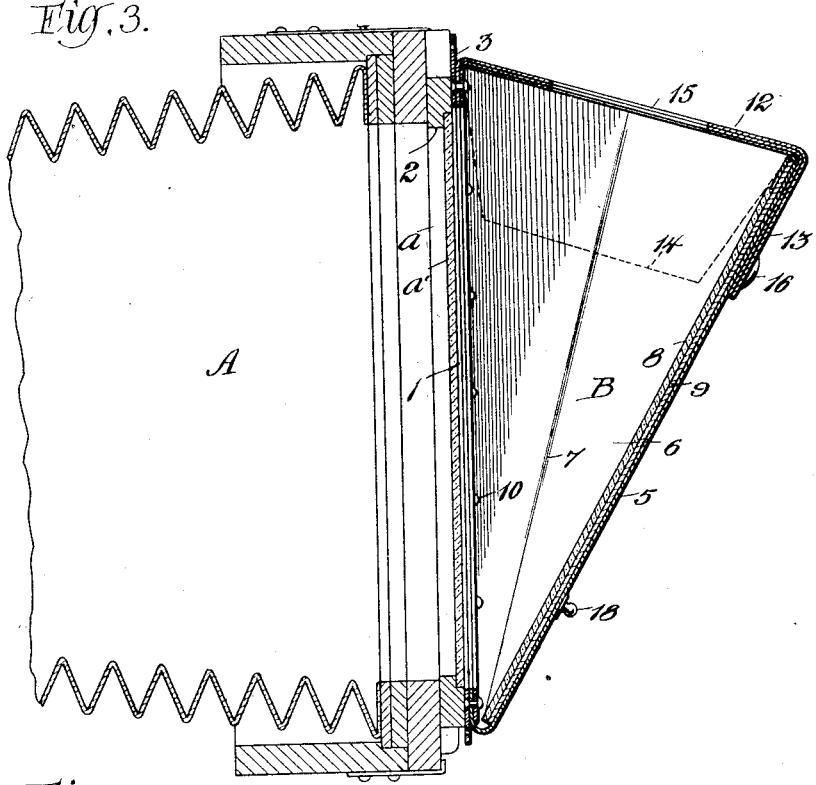
Fig. 3 is a vertical section on the line 3—3, Fig. 1, with the camera as well as the attachment shown in full lines.
Figure 4:
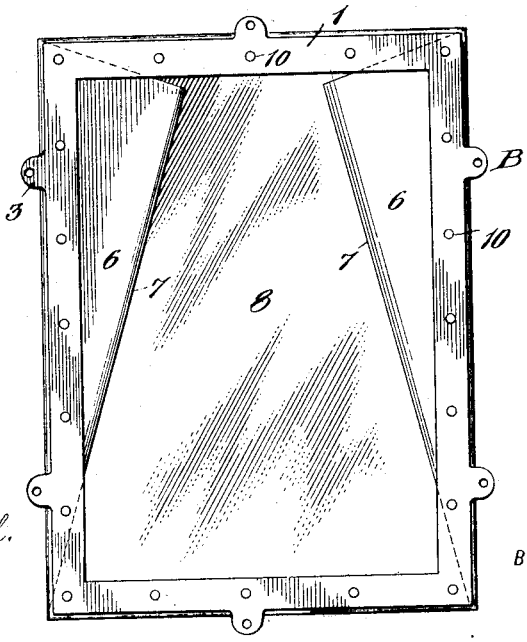
Fig. 4 is a view of the attachment removed.

Referring to the drawing, A designates a camera of ordinary construction, and B the focusing attachment which is applied to the camera back behind the ground glass. The attachment B is composed of a body having an open front, and around this open front is fastened a frame 1 of rectangular form and of such size as to border the opening 2 in the plate holder frame $a$ of the camera back. This frame 1 has a plurality of lugs 3 through which extend screws or other fastenings 4 for securing the attachment to the frame $a$. The body of the attachment is formed of a back 5 and sides 6, the back and sides consisting of a piece of leather or equivalent flexible material, and the sides are triangular in shape and have a central crease 7 whereby the sides fold inwardly, bellows-like. On the inner surface of the back 5 is a reflecting mirror 8 which is reinforced or backed by a piece of cardboard 9 glued to the mirror and to the back 5 of the attachment. The bottom edge of the back 5 and the front edges of the sides 6 are secured to the frame 1 by rivets 10 which pass through an inside metal frame 11 corresponding to the frame 1. The sides 6 are so proportioned that when the device is open, as shown in Fig. 1, the mirror will be inclined at an angle of thirty degrees more or less to the ground glass $a'$ of the camera, so that the image focused on the ground glass can be seen on the mirror by looking downwardly into the attachment. The top of the attachment when open is closed by a cover 12 also of leather or equivalent flexible material, and the front edge of this cover is riveted between the frames 1 and 11. The cover has back and side flaps 13 and 14 which extend downwardly over the outside of the back 5 and sides 6 of the body of the attachment, and in the cover 12 is a view opening 15 whereby the user can look into the attachment to see the image. A central socket 16 is provided on the flap 13 to engage a central stud 16' on the back 5 adjacent the top of the latter, so that when the attachment is open, the cover 12 is held down in the position shown in Fig. 1. When the device is closed, the sides 6 of the body are folded inwardly and the top or cover 12 with the flaps 14 folded thereunder folds down over the back 5 of the body and it is locked in this position by means of sockets 17 on the plate 13, which engage studs 18 on the back 5 adjacent the bottom thereof, and when the attachment is thus folded it lies flat against the back of the camera and takes up very little space. When folded or open the attachment presents a very neat appearance and contributes materially to the pleasure of photographing, as the image can be easily and quickly focused without the need of a cloth.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A focusing attachment adapted to be secured to the ground glass frame of a camera, said attachment comprising a frame, means thereon for securing the same to the camera, a pocket-like body fastened around two sides and the bottom to the said frame, and the body being open at the top, a cover fastened to the frame and having a view opening, an image reflecting plate in the body positioned to be seen through the said opening in the cover, separate fastening means arranged on the back of the cover at different points, a member on the cover, and complementary fastening means on the member and engaging respectively with one of the first-mentioned fastening means when the attachment is open and with another of the first-mentioned fastening means when the attachment is closed.

2. An attachment of the class described comprising an attaching frame, a pocket-like body having an open front side fastened to the frame and formed with inwardly folding sides, a cover in the form of a flap fastened at its front edge to the said frame and provided with a view opening, lugs on the frame projecting outwardly beyond the frame and the cover and having apertures to receive fasteners, a mirror arranged in the body and fastened to the rear portion thereof, said cover having depending flaps overlapping the sides and back of the body, and coöperating fasteners on the back flap of the cover and on the back of the body for holding the latter in open or closed position.

WILLIAM EHRLICH.

Copies of this patent may be obtained for five cents each, by addressing the "Commissioner of Patents, Washington, D. C."